(12) United States Patent
Richard et al.

(10) Patent No.: US 7,290,975 B2
(45) Date of Patent: Nov. 6, 2007

(54) TWO-SPEED PASSENGER LIFT AND PUMP ASSEMBLY THEREFOR

(75) Inventors: Thurman L. Richard, Stillman Valley, IL (US); Sievenpiper A. Donald, St. Charles, IL (US)

(73) Assignee: Mechanical Tech & Engineering Co., Rockford, IL (US)

(*) Notice: Subject to any disclaimer, the term of this patent is extended or adjusted under 35 U.S.C. 154(b) by 0 days.

(21) Appl. No.: 10/100,200

(22) Filed: Mar. 16, 2002

(65) Prior Publication Data

US 2002/0187032 A1     Dec. 12, 2002

Related U.S. Application Data

(60) Provisional application No. 60/276,828, filed on Mar. 17, 2001.

(51) Int. Cl.
*B60P 1/44*     (2006.01)
(52) U.S. Cl. .................. 414/539; 414/556; 414/921
(58) Field of Classification Search ................ 414/539, 414/545, 546, 556, 557, 917, 921; 318/364, 318/379, 380
See application file for complete search history.

(56) References Cited

U.S. PATENT DOCUMENTS

| | | | |
|---|---|---|---|
| 4,144,482 A * | 3/1979 | Schwab ........................ 318/381 |
| 4,175,632 A * | 11/1979 | Lassanske .................. 180/65.1 |
| 4,325,668 A | 4/1982 | Julian et al. |
| 4,471,276 A * | 9/1984 | Cudlitz ........................ 388/811 |
| 4,485,623 A * | 12/1984 | Chichester et al. ........... 60/422 |
| 4,678,063 A * | 7/1987 | Kitaoka et al. ............. 187/296 |
| 5,261,799 A | 11/1993 | Goodrich |
| 5,308,215 A | 5/1994 | Saucier |
| 5,401,135 A | 3/1995 | Stoen et al. |
| 5,433,581 A | 7/1995 | Farsai |
| 5,605,431 A | 2/1997 | Saucier et al. |
| 5,672,041 A | 9/1997 | Ringdahl et al. |
| 5,944,473 A | 8/1999 | Saucier et al. |
| 6,053,693 A | 4/2000 | Ringdahl et al. |
| 6,692,217 B1 * | 2/2004 | Pierrou ........................ 414/539 |

FOREIGN PATENT DOCUMENTS

WO     WO 03/026547     *     4/2003

* cited by examiner

*Primary Examiner*—Dean J. Kramer

(57) ABSTRACT

A passenger lift includes a lift platform that operates between a generally vertical stowed position in a motor vehicle, a substantially horizontal position at the height of the vehicle floor, and a position resting on the ground. The passenger lift is actuated by hydraulic cylinders responsive to hydraulic pressure and fluid flow from a hydraulic pump driven by a DC electric motor, in cooperation with direction and flow control components. A power-dissipating resistor is switched into and out of series with the motor to effect selected two-speed operation of the motor, the pump, the actuating cylinders and the passenger lift platform, such that one speed is used for deployment and retraction of the lift platform from and to the stowed position, and the second speed is used to raise and lower the lift platform and passenger between the vehicle and the ground.

7 Claims, 5 Drawing Sheets

"A"

"B"

"C"

TWO-SPEED PASSENGER LIFT AND PUMP ASSEMBLY THEREFOR

CROSS-REFERENCES TO RELATED APPLICATIONS

This application claims filing date priority benefit of U.S. Provisional Patent Application Ser. No. 60/276,828 filed Mar. 17, 2001.

BACKGROUND OF THE INVENTION

1. Field of Invention

The present invention relates generally to passenger lifts of the type having a lift platform that is movable between a generally vertical stowed position in a motor vehicle, a deployed horizontal position at the height of the vehicle floor, and a lowered position resting on the ground, for transporting a passenger occupying a scooter, a wheelchair or otherwise between the vehicle and the ground.

More particularly, the invention relates a passenger lift of the above type but which is adapted for two-speed operation, with one speed being used for deployment and retraction of the lift platform from and to the stowed position, and with the second speed being used to raise and lower the lift platform and passenger between the vehicle and the ground.

2. Description of Prior Art

Passenger lifts of the subject type typically utilize a parallelogram-type linkage assembly to maintain the lift platform parallel to the ground while raising and lowering a passenger. For example, Farsai, U.S. Pat. No. 5,433,581, utilizes a hydraulically driven chain and sprocket system with a parallelogram-type linkage to raise and lower the lift platform. Saucier et al., U.S. Pat. Nos. 5,944,473 and 5,605,431 utilize hydraulic cylinder actuated parallelogram linkages to effect the different motions of stowing and deploying, and raising and lowering the lift platform. And Rindgahl et al, U.S. Pat. No. 5,672,041 utilizes a mechanically actuated parallelogram linkage.

Many early passenger lifts were single speed lifts, operating at the same speed when moving between the stowed position and the deployed position at the height of the vehicle floor, and between the vehicle floor and ground level. In order to keep impact and vibrations to within reasonable limits during deployment and retraction of the lift platform, the speed of such passenger lifts is typically relatively slow. However, this results in relatively slow movement of the platform between the vehicle and the ground. Alternately, the operating speed of the lifts have been increased for desired raising and lowering of the lift platform, resulting is excessive impact and vibration during deployment and retraction operations. In either event, such single speed lifts generally exhibit certain undesirable motion characteristics either during deployment and retraction, and/or during raising and lowering of the lift platform. Therefore, in order to provide for relatively slow deployment and retraction of the lift platform, and reasonably fast raising and lowering of the platform, passenger lifts now typically include provision for at least two-speed operation.

Numerous power operating and control mechanisms for actuating and controlling the speed of movement of the subject type of passenger lift, including to establish two-speed operation, are known in the prior art. For example, Farsai utilizes hydraulic fluid flow-control for speed control of lowering the platform via gravity, and a cam-roller configuration adjustment for refinement of the deployment and retraction speed. The patents to Saucier et al. utilize a complicated flow-control schemes to control the speed of the passenger lift. Other prior passenger lifts utilize other electrical and/or flow-control arrangements to effect two-speed or multi-speed operation, including recent use of microprocessors for speed control. However, such arrangements tend to be relatively complicated, and therefore, relative expensive and correspondingly less reliable. Thus, there is a need for an improved two-speed passenger lift that is relatively simple, more reliable and less expensive than prior speed control arrangements.

In addition, it is desirable to provide currently installed single-speed passenger lifts with two-speed operation to achieve more desirable operating characteristics. Therefore, to provide such lifts with the advantages of two-speed operation, it is desirable that the speed-control of an improved passenger lift be provided in a form suitable for retrofitting onto single-speed lifts.

SUMMARY OF THE INVENTION

The general aim of the present invention is to provide a new and improved passenger lift of the above general type, that is adapted for operation at a first speed between stowed and deployed positions and at a second speed when raising and lowering a passenger, and that is more reliable and economical in implementation than prior two-speed lifts of the same general type.

Another general aim of the invention is to provide a passenger lift of the type conventionally provided with constant speed operations, but which is easily converted for two-speed operation.

A detailed objective is to achieve the foregoing by providing a hydraulically powered passenger lift including a DC electric motor driving a hydraulic pump to supply hydraulic pressure to the hydraulic actuating circuit, and economical yet reliable apparatus adapted for switching the motor between high voltage/high speed operation and low voltage/low speed operation, thus effecting switching between high pressure and low pressure operation of the hydraulic actuating circuit and associated two-speed operation of the passenger lift.

The invention further contemplates embodiment in a retrofit kit adapted for installation into an existing passenger lift to obtain two-speed operation.

These and other objectives and advantages of the invention will become more apparent from the following detailed description when taken in conjunction with the accompanying drawings.

Briefly, a passenger lift in accordance with the invention includes a lift platform that is pivotally connected via a hydraulically actuated parallelogram-type linkage into a motor vehicle of the type having a floor suitable for wheeled mobility for movement between a generally vertical stowed position in the vehicle, a generally horizontal deployed position at the height of the vehicle floor, and a lowered position at ground level. The lift platform includes a passenger tray adapted to carry the passenger between the deployed position at the vehicle floor and the lowered position at the ground. The passenger tray is provided with side walls and front and back walls that permit rolling entry and exit to and from the tray at the vehicle floor and the ground, but that prevent wheeled exit from the tray as it raises and lowers therebetween.

The passenger lift is provided with a hydraulic pump assembly that includes a hydraulic pump driven by a DC motor for actuation of the lift platform linkage, relief valves, appropriate electrical control connections and a built-in hydraulic fluid reservoir. To effect selected two speed operation, the pump assembly also includes a power-dissipating resistor electrically connected in series with the electric motor, and an electrical switch to switch the resistor into and out of the motor circuit. When the resistor is switched out of the circuit, the rated or normal DC voltage is provided to the motor for operation at rated speed, resulting in rated hydraulic pressure and flow for rated speed raising and lowering of the lift platform. When the resistor is switched into the circuit, the voltage across the motor is reduced and the motor runs at a lower predetermined speed, resulting in reduced hydraulic fluid flow and slower operating speed of the passenger lift for folding operations between the deployed and stowed positions.

Figure 1:
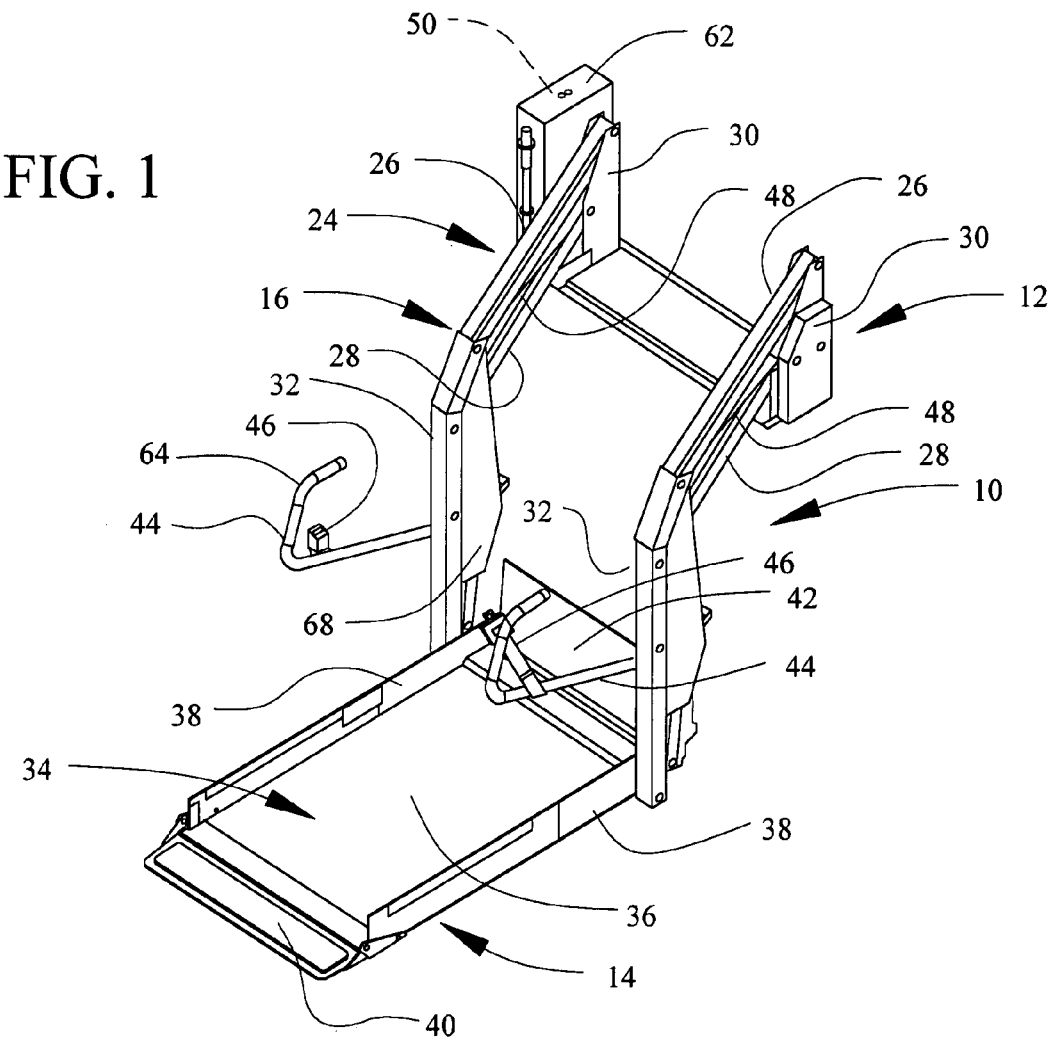
FIG. 1 is a perspective view of a two-speed passenger lift incorporating the unique aspects of the present invention and shown in the lowered position.

Reference numerals shown in the drawings correspond to following items:

| | |
|---|---|
| 10 | passenger lift |
| 12 | base assembly |
| 14 | lift platform assembly |
| 16 | actuating linkage mechanism |
| 18 | hydraulic system |
| 22 | vehicle battery |
| 24 | upper parallelogram mechanism |
| 26 | upper links of mechanism 24 |
| 28 | lower links of mechanism 24 |
| 30 | side mounts for links 26 |
| 32 | lift platform support brackets |
| 34 | passenger tray |
| 36 | bottom of tray 34 |
| 38 | sidewalls of tray 34 |
| 40 | front wall of tray 34 |
| 42 | back wall of tray 34 |
| 44 | hand grips |
| 46 | seat belt |
| 48 | hydraulic cylinders |
| 50 | hydraulic pump assembly |
| 52 | hydraulic pump |
| 54 | electric motor |
| 56 | hydraulic fluid reservoir |
| 58 | hydraulic fluid flow passages |
| 60 | relief valve |
| 62 | primary control unit in vehicle |
| 64 | remote control unit of lift platform assembly |
| 66 | vehicle floor |
| 68 | lower parallelogram mechanism |
| 70 | upper links of mechanism 68 |
| 72 | middle links of mechanism 68 |

-continued

| | |
|---|---|
| 74 | pivot joint connection between links 72 and tray sidewalls 38 |
| 76 | pivot joint connection between lift platform support brackets 32 and tray sidewalls 38 |
| 78 | pivot slide connection |
| 80 | ground level |
| 82 | electric motor circuit |
| 84 | resistor |
| 86 | switch for switching resistor into and out of electric motor circuit |
| 90 | hydraulic fluid outlet port to hydraulic cylinders |
| 92 | hydraulic fluid return port to reservoir |
| 94 | hydraulic manifold block |
| 96 | motor starter solenoid switches |
| 98 | reservoir filler-breather port |
| 100 | solenoid operated valve |
| 102 | manually operable hydraulic pump |
| 104 | solenoid operated valve |
| 106 | manually operable relief valve |
| 108 | mounting bracket |

While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings in connection with the passenger lift 10 (FIG. 1) adapted to raise and lower a person on a scooter, in a wheelchair, or otherwise between the ground 80 and the floor 66 of a motor vehicle (not shown) for ease of entry into and exiting from the vehicle.

The passenger lift 10 includes a base assembly 12 adapted for connection to the frame or floor of the vehicle (or otherwise) inside a relatively wide door such as the side door of a van or a bus, a lift platform assembly 14 sized and adapted to carry the passenger between the height of the vehicle floor 66 and the ground 80, an actuating linkage mechanism 16 operably connected between the base 12 and the lift platform 14, a hydraulic system to drive the actuating mechanism and thereby cause movement of the lift platform in response to designated operating control signals, and control apparatus operably connected to a power source on the vehicle and operative to provide the control signals to the hydraulic system for directing movement of the actuating mechanism and thus the lift platform as desired by the occupant or operator of the passenger lift.

In the embodiment shown, the lift platform 14 is responsive to the actuating mechanism 16 for controlled movement between stowed, deployed/raised, and lowered positions. During a typical duty cycle for exiting from the vehicle, the platform unfolds initially from a stowed, substantially vertical position (FIG. 2) in the vehicle to a horizontal deployed position at the height of the vehicle floor (FIG. 3), lowers from the vehicle floor height to the ground (FIG. 4), raises from the ground back to the vehicle floor height, and then folds back to the stowed position. Entering the vehicle will of course involve a duty cycle of deploying the platform from the stowed position to the ground, raising the platform to the vehicle floor, and returning the platform to the stowed position. As discussed further below, the lift platform 14 is pivotally connected to the base assembly 12 in the vehicle through the actuator linkage mechanism 16 to transition through said positions.

The lift platform assembly 14 includes a generally rectangular passenger tray 34 having a substantially flat bottom 36, laterally spaced sidewalls 38 that extend upwardly from the side edge portions of the bottom 36, a front wall 40 that is pivotally connected proximate its lower edge near the front of the tray, and a back wall 42 that is pivotally connected proximate its lower edge near the back of the tray. When the lift platform 14 is raised to the height of the vehicle floor 66, the top of the back wall 42 is pivoted rearwardly and downwardly to engage or rest on the vehicle floor and establish a bridge between the vehicle floor and the passenger tray for ease of rolling movement of, for example, a wheel chair therebetween. The back wall is then raised to substantially upright position to establish an inboard roll-stop plate for a wheeled unit on the tray while the tray is in a position away from the vehicle. When the lift platform 14 is lowered to the ground, the top of the front wall 40 is pivoted forwardly and downwardly to rest on the ground and establish an inclined or substantially horizontal ramp between the passenger tray and the ground for ease of wheeled movement therebetween. The front wall is pivoted to a substantially upright position to establish a front or outboard roll-stop plate while the passenger tray is in a position away from the ground. The lift platform shown also includes a pair of laterally spaced hand grips 44 for use by the occupant of the lift, and a seat belt 46 extending across the width of the lift such as between the extension bars of the hand grips when clasped closed.

The actuating linkage mechanism 16 includes an upper parallelogram mechanism 24 adapted to maintain the lift platform 14 in a substantially horizontal position as the platform is raised and lowered between the height of the vehicle floor 66 and the ground 80. The parallelogram mechanism 24 includes two sets of upper and lower links, 26 and 28, respectively, each set being horizontally aligned and laterally spaced on each side of the platform. The links 26 and 28 are pivotally connected between a pair of horizontally aligned, laterally spaced side mounts 30 fixed in the vehicle and a pair of outboard lift platform support brackets 32 to define the pivotally connected parallelogram structure 24. With this arrangement, the links 26 and 28 remain in parallel relation with one another, and the outboard lift platform support brackets 32 remain in fixed angular relation to the base 12, to maintain the lift platform in a horizontal position when moving between the vehicle floor and the ground.

The actuating linkage mechanism 16 also includes a lower parallelogram mechanism 68 including a pair of laterally spaced links 70 pivotally connected between the outboard lift platform support brackets 32 and links 72 on each side of the platform, the opposite end portion of links 72 being pivotally connected at 74 to the side walls 38 of the passenger tray 34, and the lower end of the lift platform support brackets 32 connected at 76 to the tray side walls 38 forwardly of the connection at 74. The lower parallelogram mechanism 68 also includes slide mechanisms 78 adapted to slidably engage the links 28 when the lift platform is raised above the height of the vehicle floor.

The hydraulic circuit 18 includes a pair of horizontally aligned, laterally spaced hydraulic cylinders 48 on each side of the lift platform and a hydraulic pump assembly 50 fluidically connected to the cylinders 48. The pump assembly includes a hydraulic pump 52 to supply hydraulic pressure and fluid flow to the cylinders 48 for actuation thereof, an electric motor 54 operatively coupled to the hydraulic pump to drive the pump, and a hydraulic fluid reservoir 56 to supply fluid to the pump 52 and receive return fluid from the hydraulic system through return ports 92. The pump assembly shown is further provided with a relief valve 60 and other desired suitable pressure and flow control components for desired hydraulic system stability, response and control characteristics, as well as suitable electrical control components and connections for similar purposes hereof. Hydraulic hoses, tubes and/or passages generally designated 58 are provided to establish pressure and fluid flow communication between the components of the hydraulic system.

To reduce the number of electrical components, the electric motor 54 is preferably a 12 VDC, 24 VDC or other standard DC voltage motor suitable for direct electrical connection to, or with minimal conditioning of, the power from the DC electric system of the vehicle in which the passenger lift is installed.

In the embodiment shown, the DC electric motor 54 and the hydraulic pump 52 are mounted to opposite sides of a manifold block 94 (see FIGS. 6–10), with the output shaft (not shown) of the electric motor directly coupled to the input shaft (not shown) of the hydraulic pump. Mounted to the side of the electric motor are a pair of motor starter solenoid switches 96, the two solenoid switches being electrically connected for starting the motor in opposite directions upon receiving appropriate electrical control signals. The reservoir is provided with a filler-breather port 98. Solenoid operated on/off valves 100 and 104 are provided in the pump manifold to establish and stop hydraulic pressure and fluid-flow delivery to the cylinders 48 so as to effect selective raising and lowering of the lift platform 14, and deploying of the lift platform from and return to the stowed position, respectively.

A hand operable pump 102 is provided extending from the manifold block 94 for manually raising the lift platform 14 in the event of a loss of electrical power. A manually operable relief valve 106 is also provided in the pump manifold to enable manually lowering of the lift platform, by relieving the pressure in the hydraulic circuit, in the event of a loss of electrical power. The entire hydraulic pump assembly 50 is mounted to a bracket 108 which is then fastened to the base 12.

To effect raising and lowering of the lift platform 14, the hydraulic cylinders 48 are connected diagonally between opposing end pivots of the links 26 and 28 (see FIG. 3) such that extension of the cylinders results in collapsing of the parallelogram mechanism 24 and lowering of the passenger lift platform from the vehicle floor 66 height to the ground 80, and retraction of the cylinders results in expansion of the parallelogram mechanism 24 and raising of the lift platform from the ground to the vehicle floor height.

Figure 2:
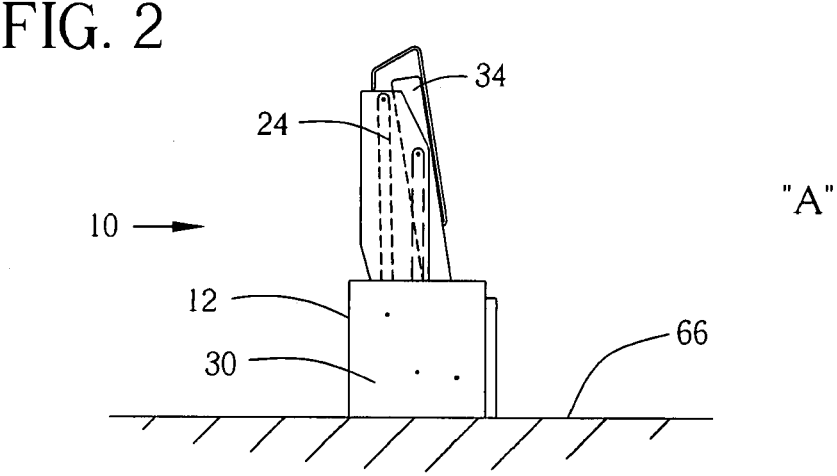
FIGS. 2–4 are side elevation views of the passenger lift shown in FIG. 1 and illustrating movement of the lift platform between the stowed position, the deployed/raised position at the height of the vehicle floor, and the lower position resting on the ground, respectively.
Figure 3:
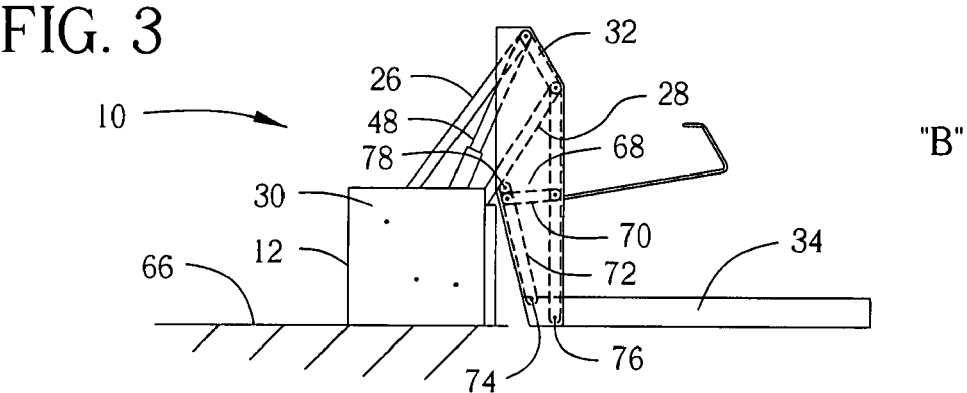
Figure 4:
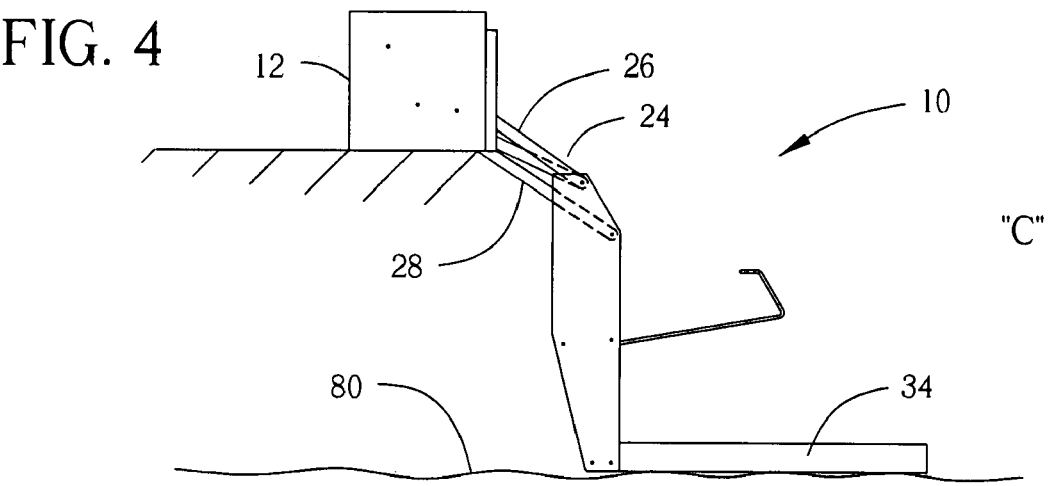
Figure 5:
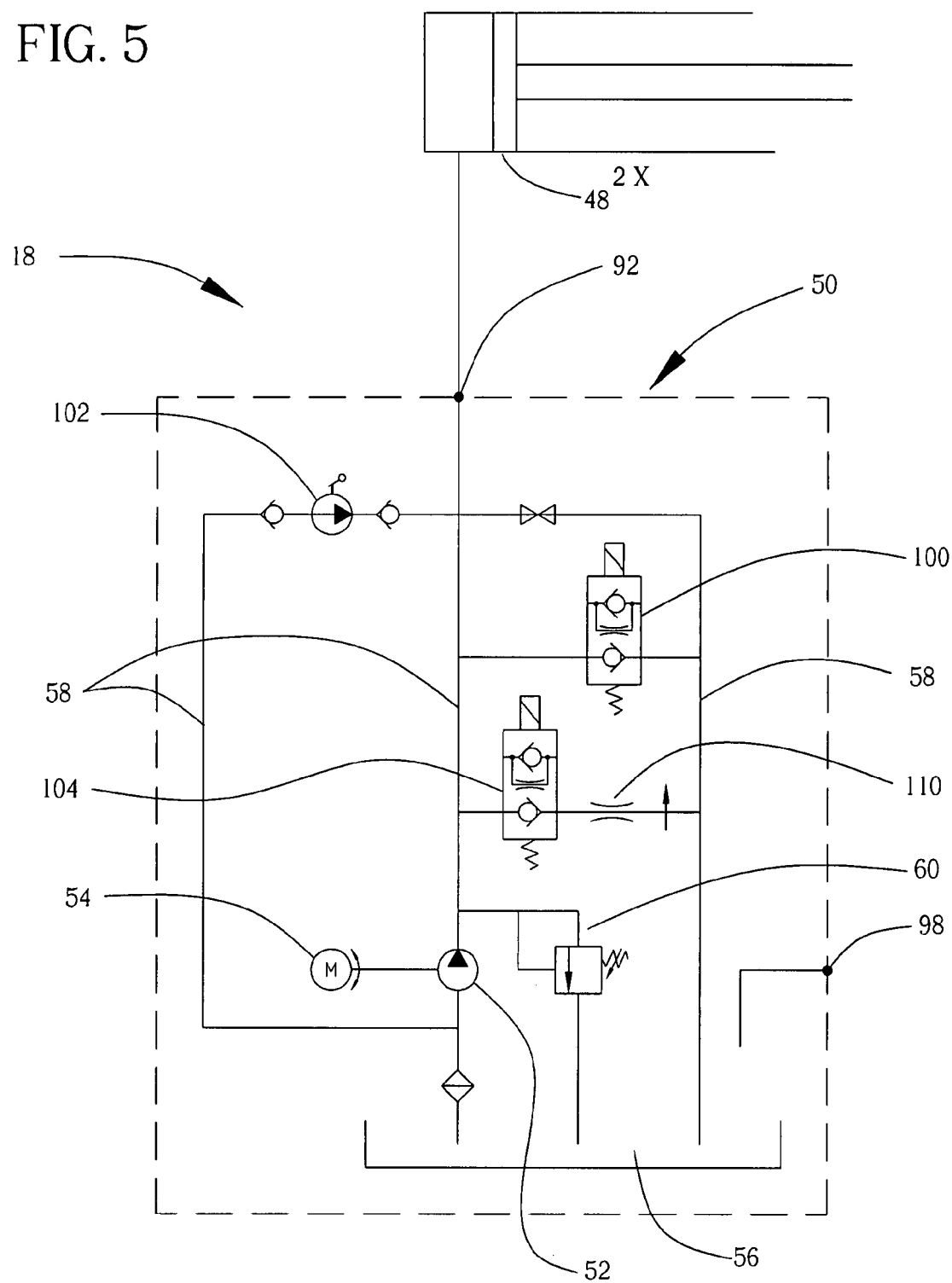
FIG. 5 is a diagrammatic representation of certain components of the hydraulic system of the passenger lift of FIG. 1.
Figure 10:
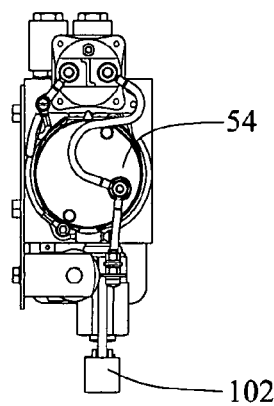
FIGS. 7–10 are left side, front, right side and top views, respectively, of the pump assembly of FIG. 6.
Figure 6:
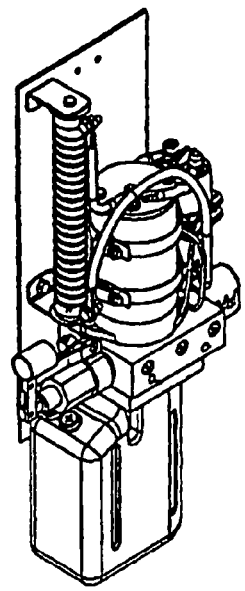
FIG. 6 is a perspective view of the electro-hydraulic pump assembly for the control actuators of the lift platform of the passenger lift of FIG. 1.
Figures 7, 8, 9:
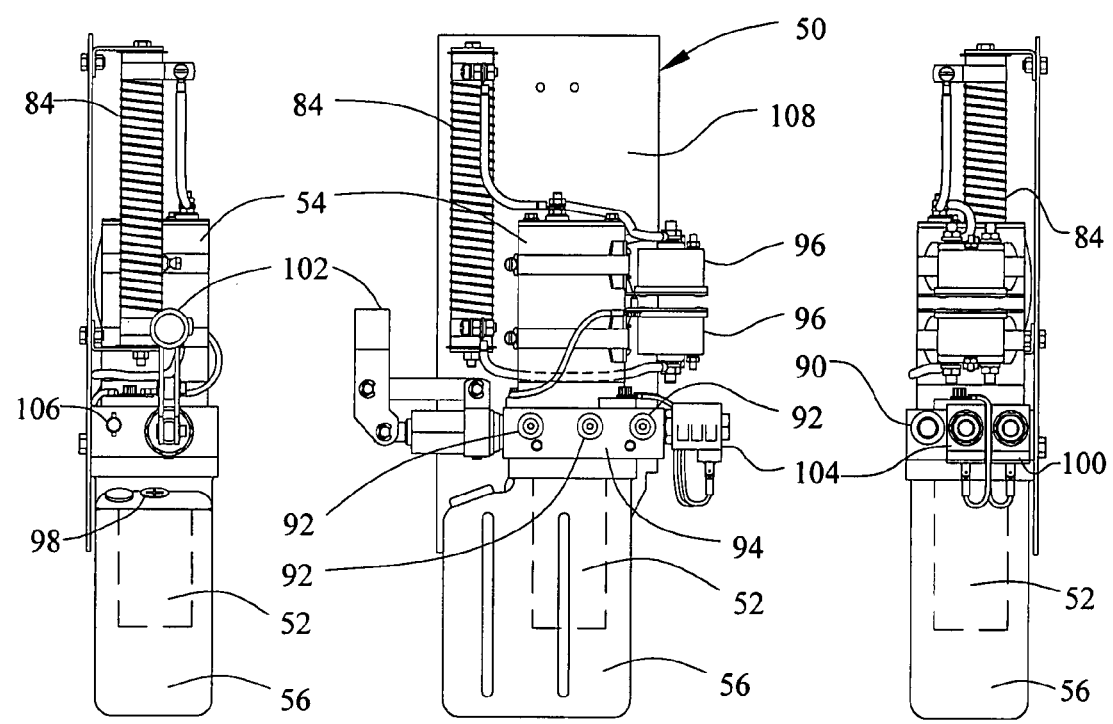

The three primary operative positions of the passenger lift 10, including the relative operation and positions of the hydraulic cylinders 48, the parallelogram mechanisms 24 and 68, the lift platform 14 and associated components are shown in FIGS. 2–4. In particular, FIG. 2 shows the lift platform in the stowed position ("A") as inside the vehicle, FIG. 3 shows the lift platform at the height of the vehicle floor (position "B"), and FIG. 4 shows the lift platform at ground level (position "C"). In the stowed position, the hydraulic cylinders are substantially fully retracted. To exit the vehicle, the passenger lift is deployed from the stowed position by supplying hydraulic pressure and fluid flow to the hydraulic cylinders and thus extending the cylinders until the lift platform reaches the height of the vehicle floor. After the passenger is safely aboard, the lift platform is lowered to ground level by further controlled extension of the hydraulic cylinders. The passenger lift is then returned to the stowed position by retraction of the hydraulic cylinders, during which slide/joint mechanisms 78 slidably engage the links 28 when the lift platform is raised above the height of the vehicle floor such that the parallelogram mechanisms 24 and 68 cooperate to pivot the lift platform upwardly into a generally vertical position and collapse the passenger lift into the stowed position.

The control system of the passenger lift includes a primary control unit 62 located in the vehicle such as on the base assembly 12, and a remote control unit 64 mounted to the passenger lift platform 14 for access by the occupant of the platform. Each control unit is operatively connected to the hydraulic system 18 and as otherwise required to effect controlled deployment of the lift platform from the stowed position "A" in the vehicle to the raised position "B" at the height of the vehicle floor and to the ground position "C", and raising of the lift platform from the ground back to the vehicle and return to the stowed position. These actions are effected, independently, by appropriate switch selection and actuation in the control units, with appropriate electrical circuit control components and connections for controlling the electric motor 54 of the pump assembly 50, and conventional position control switches or other components to determine the end of the stroke and provide a signal to stop the lift platform in each desired position.

Similar parallelogram actuating mechanisms are shown and discussed for raising and lowering a passenger lift platform in, for example, Saucier et al., U.S. Pat. Nos. 5,944,473 and 5,605,431. Other prior parallelogram actuating mechanisms are shown in, for example, Farsai, U.S. Pat. No. 5,433,581 and Rindgahl U.S. Pat. Nos. 6,053,693 and 5,672,041. As will be apparent to those skilled in the art, the invention hereof is equally suitable for use with these and other configuration passenger lift actuating linkage mechanisms when provided with suitable hydraulic circuit and control components.

In accordance with the present invention, the passenger lift 10 is provided with apparatus uniquely adapted for two-speed operation, to enable operation at a first speed during raising and lowering the lift platform 14, and at a second speed during deployment from and returning the lift platform to the stowed position in the vehicle.

More particularly, the passenger lift 10 includes unique yet relatively simple and reliable apparatus that provides for selectively controlled, two-speed operation of the hydraulic pump 52 to effect selective two-speed control of delivery of hydraulic fluid to the hydraulic cylinders 48, and thereby effecting two-speed control of the movement of the cylinders and the lift platform.

In preferred embodiments, the passenger lift 10 operates at a slower speed during deployment and stowing actions, and at a faster speed during raising and lowering of the lift platform 14. This desired speed differential assists in reducing contact, engagement and disengagement vibrations during the deployment and storing motions. Alternately, if desired, the speed differential is reversed for slower raising and lowering actions.

Figure 11:
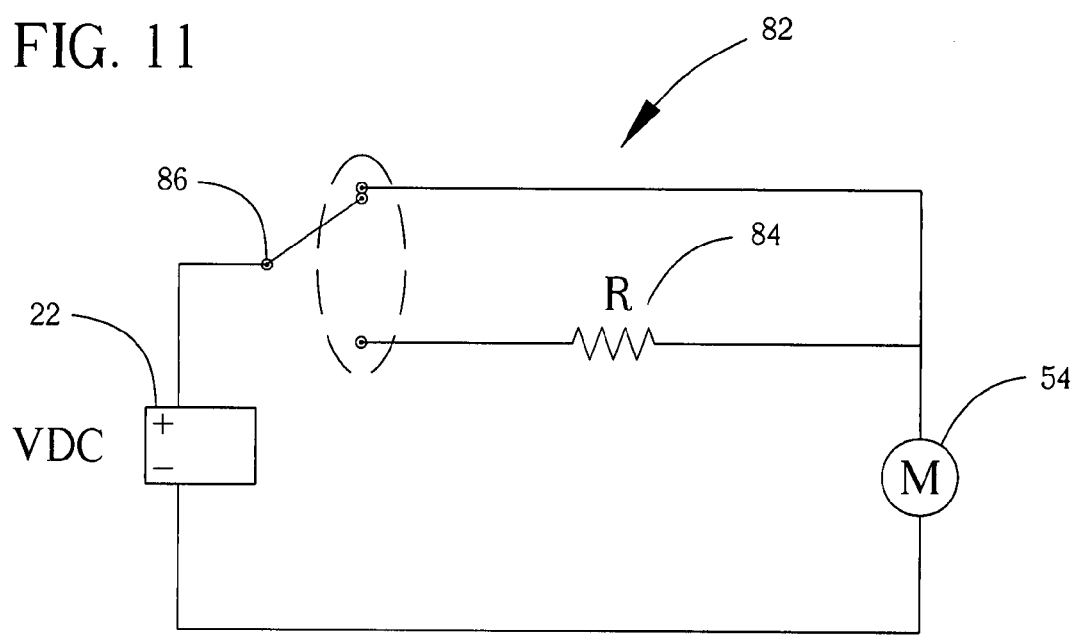
FIGS. 11 and 12 are diagrammatic representations of certain components in the electrical control system of the passenger lift of FIG. 1.
Figure 12:
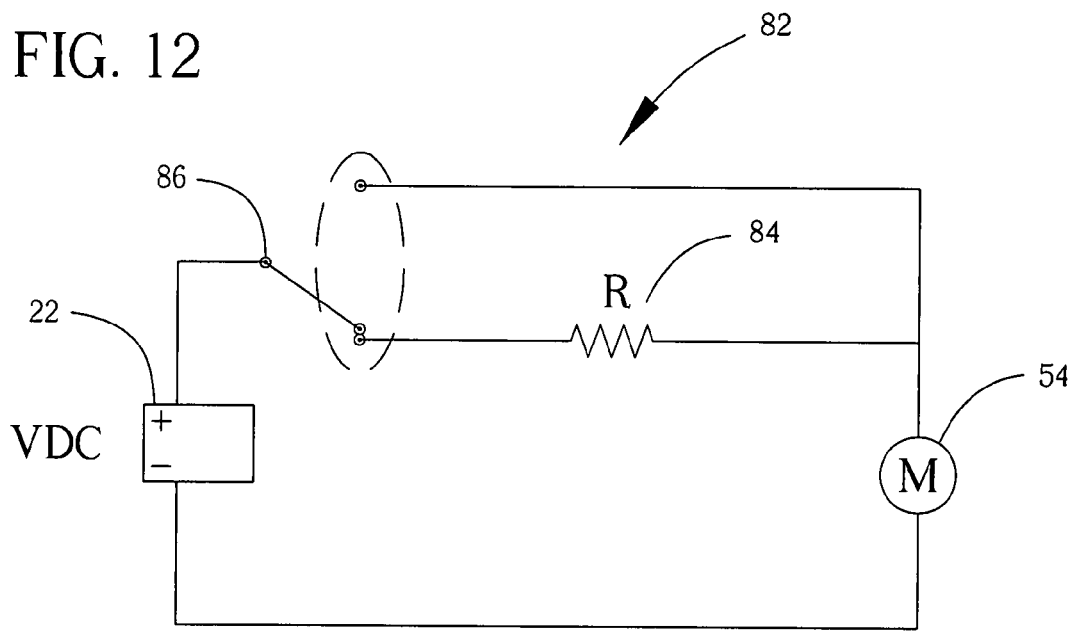

In carrying out the invention, a power-dissipating resistor 84 is electrically connected with the DC electric motor 54 in a manner such that an electrical switch 86 switches the resistor into and out of the motor circuit and causes the voltage across the motor to alternate between two distinct applied voltages. In preferred embodiments, the power-dissipating resistor is connected in series with the motor as shown generally in FIGS. 6–12 and in electrical circuit detail in FIGS. 11–12. With this arrangement, when the resistor 84 is switched out of the motor circuit as shown in FIG. 11, the rated or normal DC voltage of the electrical power supply such as the vehicle electrical system, indicated in the drawings as the battery 22 and indicated as operating at 12 VDC, is provided to the electric motor for operation of the motor at a rated speed for that voltage, resulting in delivery of a rated hydraulic pressure and fluid-flow rate from the hydraulic pump to the cylinders for raising and lowering of the lift platform at a rated speed. When the resistor is then switched into the motor circuit as shown in FIG. 12, the voltage across the motor is reduced and the motor runs at a lower speed based on the reduced applied voltage, resulting in reduced speed in the pump, reduced hydraulic pressure and fluid flow to the cylinders, and thus a reduced operating speed of the passenger lift for the folding and unfolding operations. Operational control of the switch 86 is effected by the operator or passenger by selection of the desired action at the control panel 62 in the vehicle or the control station 64 on the passenger lift handles 44. Determination of the desired operating voltage and reduced voltage across the motor, as well and the resistance and power rating of the resistor and other electrical and hydraulic parameters will be accomplished by those skilled in the art with conventional engineering, analytical or other techniques to establish desired operating speeds.

Advantageously, providing the power-dissipating resistor 84 as part of the pump assembly 50 which is preferably mounted to mounting bracket 108, or other arrangement that provides the resistor, the electric motor 54, the hydraulic pump 52, and associated control components discussed above into a unit that is easily installed into, for example, the base assembly 12, enables use of the unit as a retrofit for many existing single-speed passenger lifts currently installed into vehicles. Thus, by simply replacing the current single-speed hydraulic motor unit of such installed lifts with the two-speed unit hereof, or by replacing appropriate components thereof, single-speed lifts are easily transformed into two-speed lifts in accordance herewith.

From the foregoing, is will be apparent that the present invention brings to the art a new and improved passenger lift which, by virtue of the use of a power-dissipating resistor selectively switched into and out of the motor circuit that drives movement of the lift platform, is uniquely adapted for reliable, cost effective operation at a first speed during deployment from and retraction to a stowed position and at a second speed when raising and lowering a passenger between a vehicle and the ground.

We claim:

1. A passenger lift for use in a motor vehicle having a passenger-mobile floor and an electrical power supply, the lift comprising:

a lift platform pivotally connected to the vehicle for movement between a generally vertical stowed position in the vehicle, a generally horizontal deployed position at the height of the vehicle floor, and a lowered position at ground level;

the lift platform comprising a passenger tray to carry a passenger between said deployed and lowered positions, and back and front walls connected for movement between associated roll-stop positions and lowered positions establishing bridges between the tray and the vehicle floor and ground, respectively, when the platform is in said deployed and lowered positions, respectively;

a hydraulic actuator operatively connected to effect selected movement of the lift platform between said positions, the hydraulic actuator being primarily dependent upon fluid flow to effect said movement of the lift platform;

a hydraulic pump connected to the hydraulic actuator for supplying said fluid flow;

a DC electric motor (i) drivingly coupled to said hydraulic pump for operation thereof and (ii) electrically connected to the vehicle power supply to establish a motor power supply circuit;

a fixed-resistance power-dissipating resistor connected to the electric motor; and a switch connected for switching the fixed-resistance of the power-dissipating resistor into and out of series with the motor in the motor power supply circuit to establish two alternate motor operating voltages and associated motor and pump speeds for selected movement of the lift platform between said stowed position and said deployed position at a first speed and between said deployed position and said lowered position at a second speed to effect two-speed operation of the lift; the difference in voltage of the two alternate motor operating voltages being at least the voltage across the resistor when switched in series with the motor in the motor supply circuit.

2. A hydraulic pump assembly for use with a passenger lift mounted in a motor vehicle having a passenger-mobile floor and an electrical power supply, the passenger lift including (i) a lift platform pivotally connected to the vehicle for movement between a generally vertical stowed position in the vehicle, a generally horizontal deployed position at the height of the vehicle floor, and a lowered position at ground level, (ii) hydraulic cylinders connected between the vehicle and the lift platform for moving the lift platform between said positions, (iii) a switch for initiating movement of the lift between said positions, the hydraulic pump assembly comprising:

a mounting bracket configured for installation into the vehicle;

a hydraulic fluid manifold secured to the mounting bracket, the manifold having fluid connector means for establishing fluidic connection with the hydraulic cylinders;

a hydraulic pump secured to the manifold and in fluid communication with the hydraulic cylinders through said fluid connector means for supplying hydraulic pressure and fluid flow to the cylinders and resulting actuation thereof;

an electric motor secured to the manifold and drivingly coupled to the pump, the electric motor being electrically connected to the vehicle power supply through the switch;

a hydraulic fluid reservoir secured to the manifold for supplying fluid to the pump and receiving return fluid from the hydraulic cylinders; and a power dissipating resistor secured to the mounting bracket, the power dissipating resistor being electrically connected in a first electrical path in series with the motor and the switch, and in parallel with a second electrical path between the motor and the switch, whereby the switch is operative to switch the power dissipating resistor into and out of the electrical supply circuit from the electric power supply to the motor and thereby establish two alternate motor operating voltages and associated pump speeds for selected movement of the lift between said positions.

3. The hydraulic pump assembly as defined in claim 2 in which the manifold includes first and second opposite sides, the hydraulic pump is secured to the first side of the manifold, and the electric motor is secured to the second side of the manifold and is drivingly coupled to the pump through the manifold.

4. The hydraulic pump assembly as defined in claim 3 in which the hydraulic fluid reservoir is secured to the first side of the manifold, and the hydraulic pump is located inside the reservoir.

5. The hydraulic pump assembly as defined in claim 4 in which the mounting bracket is configured for installation of the pump assembly into a preexisting vehicle provided with a passenger lift as a retrofit unit for conversion of the preexisting lift to a two-speed operable lift by switching the power dissipating resistor into and out of the electrical supply circuit from the electric power supply to the motor.

6. A passenger lift for use in a motor vehicle having a floor and an electrical power supply, the lift comprising:

a lift platform pivotally connected to the vehicle for movement between a stowed position in the vehicle, a deployed position at the vehicle floor, and a lowered position at ground level;

a hydraulic actuator connected between the vehicle and the lift platform for movement of the lift platform between said positions;

a hydraulic fluid manifold secured to the vehicle, the manifold having fluid connector means for establishing fluidic connection with the hydraulic actuator;

a hydraulic pump secured to the manifold and in fluid communication with the hydraulic actuator through said fluid connector means for supplying hydraulic pressure and fluid flow to the actuator and resulting actuation thereof to effect said movement of the lift platform;

a hydraulic fluid reservoir secured to the manifold for supplying fluid to the pump and receiving return fluid from the hydraulic actuator;

a DC electric motor secured the manifold and drivingly coupled to the pump for operation thereof, the motor being electrically connected to the vehicle power supply to establish a motor power supply circuit;

a power-dissipating resistor connected to the electric motor; and a switch connected for switching the resistor into and out of the motor power supply circuit to establish two alternate motor operating voltages and associated motor and pump speeds for selected movement of the lift platform between said positions.

7. A passenger lift for use in a motor vehicle having a passenger-mobile floor and an electrical power supply, the lift comprising:

a lift platform pivotally connected to the vehicle for deployment from a stowed position to a deployed position at the vehicle floor, for lowering from the deployed position to a ground level position, for raising from the ground level position to the deployed position, and for retraction from the deployed position to the stowed position;

a hydraulic actuator connected between the vehicle and the lift platform for effecting said deployment, lowering, raising, and retraction of the lift platform, the hydraulic actuator being primarily dependent upon fluid flow to effect said movement of the lift platform;

a hydraulic pump in fluid communication with the actuator;

a DC electric motor drivingly coupled to the hydraulic pump, the motor being electrically connected to the vehicle power supply to establish a motor power supply circuit, the motor being operative to effect, through said pump and actuator, (i) deployment and lowering of the lift platform when operating in a first direction, and (ii) raising and retraction of the lift platform when operating in a second direction;

a fixed-resistance power-dissipating resistor connected to the electric motor; and a switch connected for switching the fixed-resistance of the power-dissipating resistor into and out of series with the motor in the motor power supply circuit to establish two alternate motor operating voltages and associated motor and pump speeds for selected movement of the lift platform between said stowed position and said deployed position at a first speed and between said deployed position and said lowered position at a second speed to effect two-speed operation of the lift; the difference in voltage of the two alternate motor operating voltages being at least the voltage across the resistor when switched in series with the motor in the motor supply circuit.

* * * * *